United States Patent
Pearce et al.

(10) Patent No.: US 6,732,072 B1
(45) Date of Patent: May 4, 2004

(54) PROCESSING RECEIVED DATA IN A DISTRIBUTED SPEECH RECOGNITION PROCESS

(75) Inventors: David John Benjamin Pearce, Basingstoke (GB); Jon Alastair Gibbs, Southampton (GB); Alun Christopher Evans, Downend (GB)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/830,305

(22) PCT Filed: Nov. 12, 1999

(86) PCT No.: PCT/EP99/09030

§ 371 (c)(1),
(2), (4) Date: Jul. 25, 2001

(87) PCT Pub. No.: WO98/44667

PCT Pub. Date: Oct. 8, 1998

(30) Foreign Application Priority Data

Nov. 13, 1998 (GB) ............................................... 9824904

(51) Int. Cl.[7] ............................................... G10L 15/00
(52) U.S. Cl. .................. 704/231; 704/270; 375/240.27
(58) Field of Search ................................ 704/200, 251, 704/270, 231; 375/220, 240.27

(56) References Cited

U.S. PATENT DOCUMENTS

| | | | | |
|---|---|---|---|---|
| 4,630,262 A | * | 12/1986 | Callens et al. | 370/435 |
| 5,121,395 A | * | 6/1992 | Millar | 714/762 |
| 5,901,186 A | * | 5/1999 | Jamal et al. | 375/346 |
| 5,960,399 A | * | 9/1999 | Barclay et al. | 704/270.1 |
| 6,363,349 B1 | * | 3/2002 | Urs et al. | 704/275 |

FOREIGN PATENT DOCUMENTS

| | | | | |
|---|---|---|---|---|
| GB | 2 306 861 | * | 5/1997 | |
| WO | WO 95/17746 | * | 6/1995 | G10L/5/06 |
| WO | WO 98/44667 | * | 10/1998 | H04J/3/00 |

* cited by examiner

*Primary Examiner*—Daniel Abebe
(74) *Attorney, Agent, or Firm*—Lawrence Chapa

(57) ABSTRACT

A method of processing received data in a distributed speech recognition process. The method comprises the steps of comparing a received form of the common header information from each of a plurality of header frames; classifying a predetermined number of the same received form as a reference; and processing one or more received data frames whose received common header information is different to the reference by using the reference form instead of the received different form. Also described is an apparatus for processing received data in a distributed speech recognition process.

12 Claims, 2 Drawing Sheets

PROCESSING RECEIVED DATA IN A DISTRIBUTED SPEECH RECOGNITION PROCESS

FIELD OF THE INVENTION

The present invention relates to a method of processing received data in a distributed speech recognition process. The present invention also relates to an apparatus for processing received data in a distributed speech recognition process. The present invention is suitable for, but not limited to, processing received data relating to speech recognition parameters when it is transmitted over a radio communications link.

BACKGROUND OF THE INVENTION

Speech recognition is a process for automatically recognising sounds, parts of words, words, or phrases from speech. Such a process can be used as an interface between man and machine, in addition to or instead of using more commonly used tools such as switches, keyboards, mouse and so on. A speech recognition process can also be used to retrieve information automatically from some spoken communication or message.

Various methods have been evolved, and are still being improved, for providing automatic speech recognition. Some methods are based on extended knowledge with corresponding heuristic strategies, others employ statistical models.

In typical speech recognition processes, the speech to be processed is sampled a number of times in the course of a sampling time-frame, for example 50 to 100 times per second. The sampled values are processed using algorithms to provide speech recognition parameters. For example, one type of speech recognition parameter consists of a coefficient known as a mel cepstral coefficient. Such speech recognition parameters are arranged in the form of vectors, also known as arrays, which can be considered as groups or sets of parameters arranged in some degree of order. The sampling process is repeated for further sampling time-frames. A typical format is for one vector to be produced for each sampling time-frame.

The above parameterisation and placing into vectors constitutes what can be referred to as the front-end operation of a speech recognition process. The above described speech recognition parameters arranged in vectors are then analysed according to speech recognition techniques in what can be referred to as the back-end operation of the speech recognition process. In a speech recognition process where the front-end process and the back-end process are carried out at the same location or in the same device, the likelihood of errors being introduced into the speech recognition parameters, on being passed from the front-end to the back-end, is minimal.

However, in a process known as a distributed speech recognition process, the front-end part of the speech recognition process is carried out remotely from the back-end part. The speech is sampled, parameterised and the speech recognition parameters arranged in vectors, at a first location. The speech recognition parameters are quantized and then transmitted, for example over a communications link of an established communications system, to a second location. Often the first location will be a remote terminal, and the second location will be a central processing station. The received speech recognition parameters are then analysed according to speech recognition techniques at the second location. The quantized speech recognition parameters, and their arrangement in vectors, constitute data that is transmitted from the first location and received at the second location. In order to facilitate transmission of this data, the data is typically arranged in a frame structure comprising a plurality of data frames each preceded by a respective header frame comprising common header information. The header frames can also be such that a header frame additionally includes header information specific only to that header frame or the particular data frame corresponding to it.

Many types of communications links, in many types of communications systems, can be considered for use in a distributed speech recognition process. One example is a conventional wireline communications system, for example a public switched telephone network. Another example is a radio communications system, for example TETRA. Another example is a cellular radio communications system. One example of an applicable cellular communications system is a global system for mobile communications (GSM) system, another example is systems such as the Universal Mobile Telecommunications System (UMTS) currently under standardisation.

For the sake of avoiding any confusion, it is pointed out that the data frames described above should not be confused with transmission frames that are then used in the transmission of the data over the communications link of the communications system in which the data is transmitted from a first location to a second location, for example the time division multiple access (TDMA) time frames of a GSM cellular radio communications system.

The use of any communications link, in any communications system, causes the possibility that errors will be introduced into the data and also the header information that is transmitted from the first location to the second location over the communications link.

Due to the specialised speech recognition techniques the speech parameters are subjected to, it is desirable to provide means for processing the received data that offer a degree of resilience to errors introduced in the header information in such a way that is particularly suited to the characteristics of distributed speech recognition processes.

Additionally, it is known to provide error detection techniques in communications systems such that the presence of an error in a given portion of transmitted information is detectable. One well known technique is cyclic redundancy coding. It is also known to provide automatic error correction techniques in communications systems such that an error in a given portion of transmitted information is corrected. One well known technique is Golay error correction. It is also known to employ error detection and error correction in combination.

When automatic error correction is applied there is a risk that the corrected form of the overall portion of information being corrected will contain further discrepancies other than the original error part, since such methods tend to involve an approximation to a best overall assumed correct solution. This is the case for forward error correction techniques which employ encoding using a block-based coding scheme. One such example is Golay coding, which allows for example 12 bits of information to be sent in 24 bits whilst allowing for up to 3 errors to be corrected. The correction technique involves correction of a whole portion of information, for example a whole header frame in a composite fashion. If however more than 3 errors occur in the 24 bits, then the correction technique will correct the whole header to a wrong corrected version. It is desirable to provide means processing received data that alleviates problems associated with composite correction of a whole header frame to a wrong corrected version in a distributed speech recognition process.

Also, techniques of automatic error correction that may not cause secondary problems when applied to other forms of information are not necessarily without problem when applied to errors in the above described header frames in a distributed speech recognition process, due in part to the way the data in the corresponding data frames is processed using respective header frame information. Hence it is desirable to provide means for processing received data in a distributed speech recognition process that alleviate secondary problems.

SUMMARY OF THE INVENTION

The present invention addresses some or all of the above aspects.

According to one aspect of the present invention, there is provided a method of processing received data in a distributed speech recognition process, as claimed in claim 1.

According to another aspect of the invention, there is provided an apparatus for processing received data in a distributed speech recognition process as claimed in claim 7.

Further aspects of the invention are as claimed in the dependent claims.

The present invention tends to provide means for processing received data which are particularly appropriate to the nature of the distributed speech recognition process, the form in which data is received therein when transmitted from a first location to a second location, and the way in which such data is processed after receipt at the second location in a distributed speech recognition process.

Particularly, the possibility of allowing latency in a speech recognition process is exploited in the method of the present invention. More particularly exploited is the factor that in a distributed speech recognition process latency towards the start of a message is often particularly acceptable when combined with low latency at the end of the message.

Additional specific advantages are apparent from the following description and figures.

DESCRIPTION OF A PREFERRED EMBODIMENT OF THE INVENTION

In the exemplary embodiments described below, the speech recognition parameters are arranged in vectors corresponding to sampling time-frames as shown schematically in FIG. 1.

Figure 1:
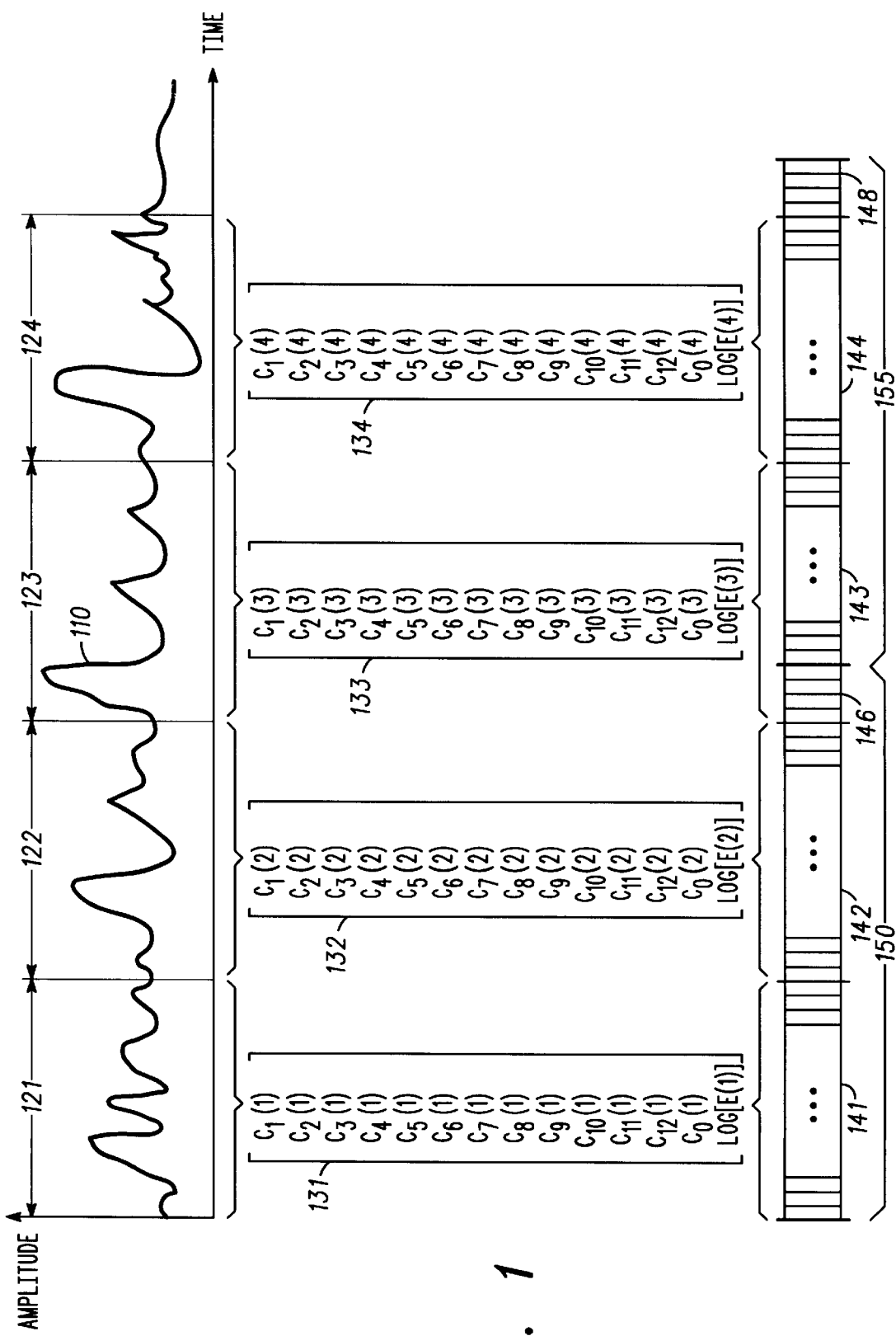
FIG. 1 is a schematic illustration of speech recognition parameters arranged in vectors corresponding to sampling time-frames of an embodiment of the present invention.

A portion of speech signal 110 to be processed is shown in FIG. 1. Speech signal 100 is shown in greatly simplified form, since in practise it will consist of a much more complicated sequence of sample values. Sampling time-frames, of which in FIG. 1 are shown a first sampling time-frame 121, a second sampling time-frame 122, a third sampling time-frame 123 and a fourth sampling time-frame 124, are imposed upon the speech signal as shown in FIG. 1. In the embodiment described below there are 100 sampling time-frames per second. The speech signal is sampled repeatedly in the course of each sampling time-frame.

In the embodiments described below, the speech recognition process is one in which a total of fourteen speech recognition parameters are employed. The first twelve of these are the first twelve static mel cepstral coefficients, i.e.

$$c(m) = [C_1(m), c_2(m), \ldots, c_{12}(m)]^T,$$

where m denotes the sampling time-frame number. The thirteenth speech recognition parameter employed is the zeroth cepstral coefficient, i.e. $c_0(m)$. The fourteenth speech recognition parameter employed is a logarithmic energy term, i.e. $\log[E(m)]$. Details of these coefficients and their uses in speech recognition processes are well known in the art and do not require further description here. Moreover, it is noted that the invention can be carried out with other combinations of cepstral coefficients forming the speech recognition parameters, likewise with other choices or schemes of speech recognition parameters other than cepstral coefficients.

The fourteen parameters for each sampling time-frame are arranged, or formatted, into a corresponding vector, also known as an array, as shown in FIG. 1. Vector 131 corresponds to sampling time-frame 121, vector 132 corresponds to sampling time-frame 122, vector 133 corresponds to sampling time-frame 123, and vector 134 corresponds to sampling time-frame 124. Such a vector can generally be represented as $$y(m) = \begin{bmatrix} c(m) \\ c_0(m) \\ \log[E(m)] \end{bmatrix}.$$

The speech recognition parameters are processed prior to transmission from a first location to a second location. In the embodiment described below this is carried out as follows. The parameters from vector 131 are quantized. This is implemented by directly quantizing the vector with a split vector quantizer. Coefficients are grouped into pairs, and each pair is quantized using a vector quantization (VQ) codebook predetermined for that respective pair. The resulting set of index values is then used to represent the speech frame. Coefficient pairings, by front-end parameter are as shown in Table 1, along with the codebook size used for each pair.

TABLE 1

Split Vector Quanization Feature Pairings

| Codebook | Size | Weight Matrix ($W^{i,i+1}$) | Element 1 | Element 2 |
|---|---|---|---|---|
| $Q^{0,1}$ | 64 | I | $c_1$ | $c_2$ |
| $Q^{2,3}$ | 64 | I | $c_3$ | $c_4$ |
| $Q^{4,5}$ | 64 | I | $c_5$ | $c_6$ |
| $Q^{6,7}$ | 64 | I | $c_7$ | $c_8$ |
| $Q^{8,9}$ | 64 | I | $c_9$ | $c_{10}$ |
| $Q^{10,11}$ | 64 | I | $c_{11}$ | $c_{12}$ |
| $Q^{12,13}$ | 256 | non-identity | $c_0$ | $\log[E]$ |

The closest VQ centroid is found using a weighted Euclidian distance to determine the index, $$d_j^{i,i+1} = \begin{bmatrix} y_i(m) \\ y_{i+1}(m) \end{bmatrix} - q_j^{i,i+1}$$

$$idx^{i,i+1}(m) = \operatorname*{argmin}_{0 \le j \le (N^{i,i+1}-1)} \{(d_j^{i,i+1})^t W^{i,i+1}(d_j^{i,i+1})\}, \quad i = 0, 2, 4, \ldots 12$$

where $q_j^{i,i+1}$ denotes the jth codevector in the codebook $Q^{i,i+1}$, $N^{i,i+1}$ is the size of the codebook, $W^{i,i+1}$ is the (possibly identity) weight matrix to be applied for the codebook $Q^{i,i+1}$, and $idx^{i,i+1}(m)$ denotes the codebook index chosen to represent the vector $[y_i(m), y_{i+1}(m)]^T$.

The indices that are produced are then represented in the form of 44 bits. These 44 bits are placed in the first 44 slots, as shown by reference numeral 141 in FIG. 1, of a bit stream frame 150. The corresponding 44 bits produced for the following vector, namely vector 132, are placed in the next 44 slots, as shown by reference numeral 142 in FIG. 1, of the bit stream frame 150. The remaining bits of the bit stream frame 150 consist of 4 bits of cyclic redundancy code, as shown by reference numeral 146 in FIG. 1, the value of the bits being determined such as to provide error detection, in a known fashion, for the whole of the 88 preceding bits of the bit stream frame 150. Similarly, the 44 bits provided from vector 133 are placed in the first 44 slots, as shown by reference numeral 143 in FIG. 1, of a second bit stream frame 155. Also, the corresponding 44 bits produced for the following vector, namely vector 134, are placed in the next 44 slots, as shown by reference numeral 144 in FIG. 1, of the bit stream frame 155. The remaining bits of the bit stream frame 155 consist of 4 bits of cyclic redundancy code, as shown by reference numeral 148 in FIG. 1. This arrangement is repeated for following vectors. The above described format of the bit stream frames, in which bit data from two vectors is arranged in a single combined bit stream frame, is merely exemplary. For example, each vector's data could instead be arranged in a single bit stream frame containing its own error detection bits. Similarly the number of slots per bit stream frame is merely exemplary.

Figure 2:
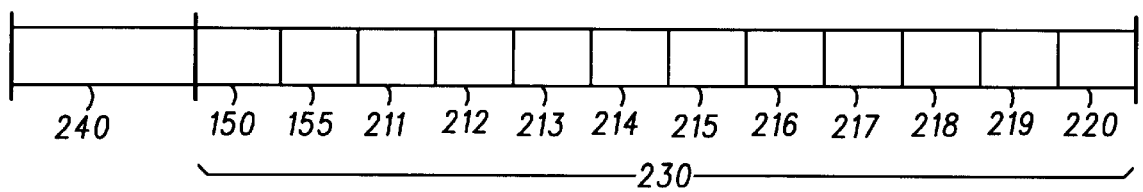
FIG. 2 is a schematic illustration of a header frame, and bit stream frames arranged in a data frame, of an embodiment of the present invention.
Figure 3:
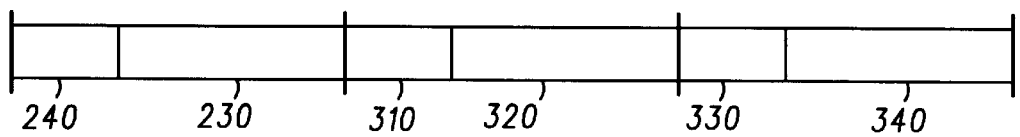
FIG. 3 is a schematic illustration of data frames and header frames of an embodiment of the present invention.

The data contained and arranged in the above described bit stream frames is further arranged as shown in FIG. 2. The bit stream frames are arranged in data frames each comprising one or more bit stream frames. In the present embodiment each data frame contains 12 bit stream frames. In the present example, therefore, data frame 230 is shown in FIG. 2 and consists of bit stream frames 150 and 155 plus ten further bit stream frames referenced 211–220. Data frame 230 is preceded by its corresponding header frame 240, as also shown in FIG. 2. Respective data frames, each with their respective header frame preceding it, are arranged consecutively as shown in FIG. 3, where header frame 240 precedes its corresponding data frame 230, header frame 310 precedes its corresponding data frame 320, and header frame 330 precedes its corresponding data frame 340. In practice many such header frames with corresponding data frames will follow. In the present embodiment, each header frame consists of 24 slots. The above described format of the data frames and header frames is merely exemplary. Similarly the number of bit stream frames per data frame, and the number of slots in a header frame, are merely exemplary.

Each header frame comprises common header information. That is information which is the same in each header. This information is used when the data is processed as described above, where the example was given that the information used was that of which sampling rate was applicable. In the present example the possible sampling rate values are 8 kHz and 16 kHz. Another possibility is information as to whether a standard or a noise robust protocol or track is applicable.

Each header frame can optionally further comprise frame-specific information, that is information that varies to some extent for different headers. One example of frame-specific information contains an end-of-message indicator, that is a signal that indicates the message is ending, according to a first end-of-message recognition method. In the present examples the first end-of-message recognition method consists of searching for all-zero bit stream frames within the last data frame, signalled by the end-of-message indicator within the header, which are inserted by the transmitter to pad out the data frame to the correct length The end-of-message indicator consists of a single bit set within the frame-specific data portion of the header. Another example of frame-specific information is one which in effect represents a parallel channel to the speech, for example a signal of a button press.

An optional aspect of the present invention, wherein the header information is forward error correction encoded using a block-based coding scheme, is employed in the exemplary embodiments described below. The particular type of such error protection employed in the present examples is Golay error protection, whose general characteristics and mode of employ are well known in the art. In the present case the particular values and so on employed are as follows. The information for the header frame is represented in a [24, 12, 8] extended systematic Golay codeword. This code will support 12-bits of data and has an error correction capability for up to three bit errors. This process provides capacity up to a total of 24 bits, consisting of 12 bits available for the header information plus 12 parity bits from the error protection. If the header information to be used is such that it requires less than its total available 12 bits in the scheme, then such bits can be set permanently at zero and effectively consigned as available for use in future changes, i.e. called expansion bits Ordering of the 24 bits into fields is carried out in a known fashion by the skilled person. In the present example, ordering is as shown in Table 2 below, and definition of the fields is as shown in Table 3 below.

TABLE 2

| Bit | | | | | | | | |
|---|---|---|---|---|---|---|---|---|
| 8 | 7 | 6 | 5 | 4 | 3 | 2 | 1 | Octet |
| EXP5 | EXP4 | EXP3 | EXP2 | EXP1 | feType | endflag | sam rate | 1 |
| P4 | P3 | P2 | P1 | EXP9 | EXP8 | EXP7 | EXP6 | 2 |
| P12 | P11 | P10 | P9 | P8 | P7 | P6 | P5 | 3 |

TABLE 3

| Field | Meaning | Code | Indicator |
|---|---|---|---|
| sam rate | sampling rate | 0 | 8 kHz |
| | | 1 | 16 kHz |
| endFlag | last multiframe | 0 | standard |
| | | 1 | last frame |
| feType | front-end specification | 0 | standard (Track 1) |
| | | 1 | noise robust (Track 2) |
| EXP1–EXP9 | expansion bits (TBD) | 0 | (zero pad) |
| P1–P12 | Golay code parity bits | | (see below) |

The Golay generator polynomial used is $$g_1(X) = 1 + X^2 + X^4 + X^5 + X^6 + X^{10} + X^{11}$$

The standard [23, 12] Golay code is extended, with the addition of an even overall parity check bit, to 24 bits. The parity bits of the codeword are generated using the calculation.

$$\begin{bmatrix} P_1 \\ P_2 \\ P_3 \\ P_4 \\ P_5 \\ P_6 \\ P_7 \\ P_8 \\ P_9 \\ P_{10} \\ P_{11} \\ P_{12} \end{bmatrix} = \begin{bmatrix} 1 & 0 & 1 & 0 & 1 & 1 & 1 & 0 & 0 & 0 & 1 & 1 \\ 1 & 1 & 1 & 1 & 1 & 0 & 0 & 1 & 0 & 0 & 1 & 0 \\ 1 & 1 & 0 & 1 & 0 & 0 & 1 & 0 & 1 & 0 & 1 & 1 \\ 1 & 1 & 0 & 0 & 0 & 1 & 1 & 1 & 0 & 1 & 1 & 0 \\ 1 & 1 & 0 & 0 & 1 & 1 & 0 & 1 & 1 & 0 & 0 & 1 \\ 0 & 1 & 1 & 0 & 0 & 1 & 1 & 0 & 1 & 1 & 0 & 1 \\ 0 & 0 & 1 & 1 & 0 & 0 & 1 & 1 & 0 & 1 & 1 & 1 \\ 1 & 0 & 1 & 1 & 0 & 1 & 1 & 1 & 0 & 0 & 0 & 1 \\ 0 & 1 & 0 & 1 & 1 & 0 & 1 & 1 & 1 & 1 & 0 & 0 \\ 0 & 0 & 1 & 0 & 1 & 1 & 0 & 1 & 1 & 1 & 1 & 0 \\ 1 & 0 & 1 & 1 & 1 & 0 & 0 & 0 & 1 & 1 & 0 & 1 \\ 0 & 1 & 0 & 1 & 1 & 1 & 0 & 0 & 0 & 1 & 1 & 1 \end{bmatrix}^T \cdot \begin{bmatrix} sampRate \\ endFlag \\ feType \\ EXP\ 1 \\ EXP\ 2 \\ EXP\ 3 \\ EXP\ 4 \\ EXP\ 5 \\ EXP\ 6 \\ EXP\ 7 \\ EXP\ 8 \\ EXP\ 9 \end{bmatrix}$$

where T denotes the matrix transpose.

For the sake of avoiding any confusion, it is pointed out that the header frames, bit stream frames and data frames described above should not be confused with transmission frames that are then used in the transmission of the bit stream data over the communications link of the communications system in which the data is transmitted from a first location to a second location, for example the time division multiple access (TDMA) time frames of a GSM cellular radio communications system, which is the communications system employed in the embodiments herein described. In the present example the first location consists of a remote user station, and the second, i.e. receiving location, consists of a centralised processing station, which can be located for example at a base station of the cellular communications system. Hence in the embodiments herein described the speech recognition parameters are transmitted from the first location to the second location over a radio communications link. However, it is to be appreciated that the nature of the first location and the second location will depend upon the type of communications system under consideration and the arrangement of the distributed speech recognition process therein.

The header frames and data frames are reconstituted from their transmission format at the second location after being received there. Thereafter the data contained in the header frames and data frames is processed using respective header frame information. One way in which the respective header frame information is used that the information contained therein of which sampling rate has been employed is used. Processing of the data includes retrieving the speech recognition parameters from the bit stream frames, as well as carrying out speech recognition itself. Alternatively processing can include carrying out procedures derived from appropriate types of frame-specific header information. In an example described above, the frame-specific header information in effect represents a parallel channel to the speech, for example a signal of a button press, and hence processing can include responding appropriately in a known fashion to such a signal.

Retrieving the speech recognition parameters from the bit stream frames, as mentioned in the above paragraph, is carried out as follows. The speech recognition parameters are retrieved from the bit stream frames by carrying out a reverse version of the vector quantization procedure described above. More particularly, indices are extracted from the bit stream, and using these indices, vectors are reconstituted in the form $$\begin{bmatrix} \hat{y}_i(m) \\ \hat{y}_{i+1}(m) \end{bmatrix} = q_{idx^{i,i+1}}^{i,i+1}(m) \quad i = 0, 2, 4, \ldots, 12$$

Also, since in the exemplary embodiments below the header information is forward error correction encoded using a block-based coding scheme, such error correction needs to be decoded after the data is received at the second location. In the present Golay error protection case, such decoding may be carried out in any one of several ways well known to those skilled in the art.

Thus, above is described a distributed speech recognition process in which data is arranged in a frame structure comprising a plurality of data frames each preceded by a respective header frame comprising header information including common header information, said data is received at a second location having been transmitted from a first location, and said data is processed using respective header frame information, and in which the header information is forward error correction encoded using a block-based coding scheme.

Figure 4:
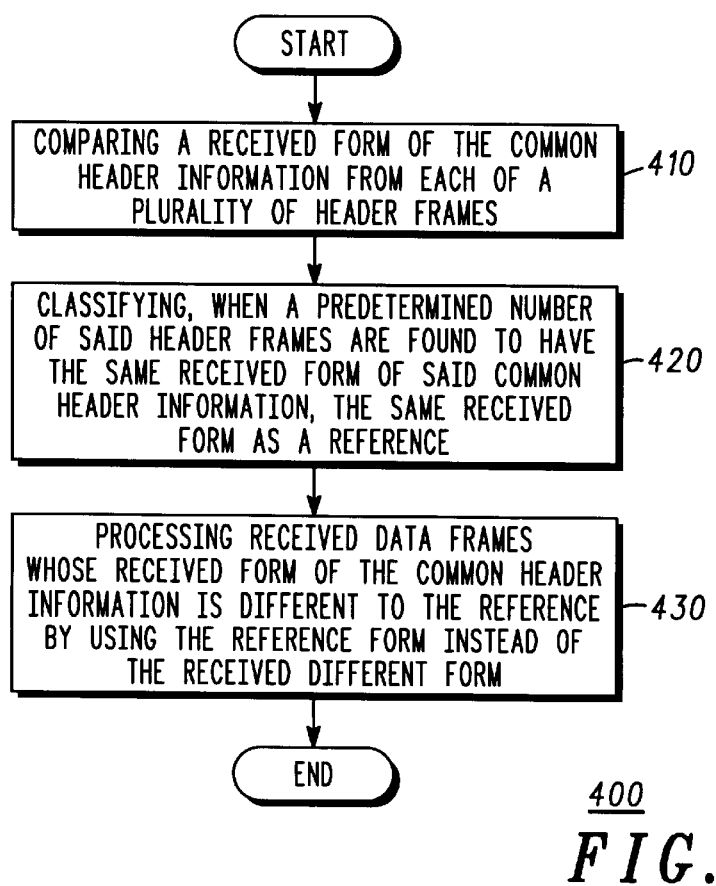
FIG. 4 is a process flow chart of an embodiment of the present invention.

The method of processing received data in such a speech recognition process according to a first embodiment is shown in process flow chart 400 of FIG. 4. Referring to FIG. 4, function box 410 shows the step of comparing a received form of said common header information from each of a plurality of header frames. In the present embodiment, this consists of comparing the received form of common header information from header frame 240, header frame 310, header frame 330 and following header frames. The common header frame information to be compared is, in the present embodiment, the indicated value of the sampling rate and whether the track is standard or noise robust.

The next step is that of classifying, when a predetermined number of said header frames are found to have the same received form of said common header information, the same received form as a reference, as shown in function box 420 of FIG. 4. In the present embodiment the predetermined number is thirty, but this number will in general be chosen according to the requirements of the particular system under consideration. By carrying out this method step, confidence is gained in the values of the common header information that is to be used. The delay introduced whilst this procedure is carried out, particularly if the predetermined number is set at a much higher level, is accommodated in the present invention since it makes use of the characteristic of a distributed speech recognition system in which latency at the start of the message is relatively acceptable.

The next step is that of processing one or more received data frames corresponding to respective header frames whose received form of the common header information is different to said reference by using the reference form instead of the received different form, as shown in function box 430 of FIG. 4. Thus incorrectly received or untrustworthy versions of the common header information are excluded, and instead the relevant data frames are advantageously processed according to the correct common header information.

One version of the present embodiment includes the option wherein the header information further comprises frame-specific header information, specifically the frame-specific header information in effect represents a parallel channel to the speech, namely a signal of a button press. Normally processing will include responding appropriately in a known fashion to this signal. However, in this version of the present embodiment, the frame-specific header information of the one or more header frames whose received form of the common header information is different to said reference is excluded from use, i.e. the response to the button press signal is blocked. By doing this, an untrustworthy instruction is avoided, based on the aspect that if the common header information of that header frame is incorrect, then there is an increased likelihood that the frame-specific information within the same header frame is also incorrect.

Another version of the present embodiment also includes the option wherein the header information further comprises frame-specific header information, specifically it contains a field which is used to indicate, when appropriate, an end-of-message indicator of a first end of message recognition method. The first end-of-message recognition method is as described earlier above. With respect to the exemplary header field layout described above and with reference to Table 2 and Table 3, it is noted that the end-of-message indicator field makes use of one or more of the future expansion spaces made available in those tables. Normally processing will include responding to this end-of-message indicator by implementing an end-of-message procedure. However, in this version of the present embodiment, the frame-specific header information of the one or more header frames whose received form of the common header information is different to said reference, namely the end-of-message indicator of the first end-of-message recognition method, is used in a different way compared to the frame-specific header information of those header frames whose received form of the common header information is the same as said reference. In particular, in response to what on face value is the end-of-message indicator, instead of actually implementing the end-of-message procedure, what is done instead is that a second end-of-message procedure is triggered. Therefore, on the one hand, a possible false implementation of the end-of-message procedure is avoided, by virtue of avoiding the need to respond to the indicator when the indicator may well be in error since it is contained in a header frame which has already false common information, but on the other hand an alternative end-of-message procedure has been activated in the sense of a back-up to ensure end-of-message is indeed detected when the end-of-message indication was in fact correct despite being contained in a partially incorrect header frame. It is to be appreciated that the above described end-of-message subject matter merely represents one example of the types of frame-specific information that can treated differently according to common header information discrepancies, according to the invention. Indeed this aspect of the invention is on the contrary applicable to any types of frame-specific-information that would benefit from cautious treatment when there are suspicions that the information has a higher likelihood of error in header frames that already have been shown to have an error in the common information part thereof.

All of the above described embodiments can include the optional feature wherein said header information is forward error correction encoded using a block-based coding scheme. Details of how such a scheme is implemented have already been given above. When this feature is included, the advantages of the present invention are particularly amplified, due to the composite nature of such types of error correction. Since the whole header frame is corrected in a composite manner, if the common header formation is found to be different to what should have been received, then fundamentally the rest of the header information is most likely in error also. In the present examples, this is particularly likely to occur when more than three bits in one header frame are in error.

In the embodiments so far, the data frames received before the reference is determined are simply excluded from the later processing stage. In a trade-off sense, this gives advantages of reduced processing. However, in alternative embodiments, data frames received before said reference is determined are buffered prior to processing after said reference is determined. In terms of trade-off, these alternative embodiments provide better quality in the sense that data is not lost, although more processing, including more buffering, is required. These alternative embodiments furthermore provide additional advantageous use of the latency characteristics of a distributed speech recognition process, in particular the aspect that latency at the start of the message is relatively easily tolerated.

In the case of the embodiments described above, the data processing steps described are carried out by a programmable digital signal processing device, such as one selected from the DSP56xxx (trademark) family of devices from Motorola. Alternatively an application specific integrated circuit (ASIC) can be employed. Other possibilities also exist. For example, an interface unit can be employed that interfaces between a radio receiver and a computer system forming part of a back-end speech recognition processor.

What is claimed is:

1. A method of processing received data in a distributed speech recognition process, the distributed speech recognition process being one in which data is arranged in a frame structure comprising a plurality of data frames each preceded by a respective header frame comprising header information including common header information, said data is received at a second location having been transmitted from a first location, and said data is processed using respective header frame information; the method comprising the steps of:

comparing a received form of said common header information from each of a plurality of header frames;

classifying, when a predetermined number of said header frames are found to have the same received form of said common header information, the same received form as a reference; and processing one or more received data frames corresponding to respective header frames whose received form of the common header information is different to said reference by using the reference form instead of the received different form.

2. A method according to claim 1, wherein said header information further comprises frame-specific header information, and wherein the frame-specific header information of the one or more header frames whose received form of the common header information is different to said reference is excluded from use.

3. A method according to claim 1, wherein said header information further comprises frame-specific header information, and wherein the frame-specific header information of the one or more header frames whose received form of the common header information is different to said reference is used in a different way compared to the frame-specific header information of those header frames whose received form of the common header information is the same as said reference.

4. A method according to claim 3, wherein the frame-specific information used in a different way is an end-of-message indicator of a first end of message recognition method, and responsive thereto is triggered a second end-of-message recognition method.

5. A method according to any preceding claim 4, wherein said header information is forward error correction encoded using a block-based coding scheme.

6. A method according to any preceding claim 5, wherein data frames received before said reference is determined are buffered prior to processing after said reference is determined.

7. An apparatus for processing received data in a distributed speech recognition process, the distributed speech recognition process being one in which data is arranged in a frame structure comprising a plurality of data frames each preceded by a respective header frame comprising header information including common header information, said data is received at a second location having been transmitted from a first location, and said data is processed using respective header frame information;

the apparatus comprising:
means for comparing a received form of said common header information from each of a plurality of header frames;
means for classifying, when a predetermined number of said header frames are found to have the same received form of said common header information, the same received form as a reference; and
means for processing one or more received data frames corresponding to respective header frames whose received form of the common header information is different to said reference by using the reference form instead of the received different form.

8. An apparatus according to claim 7, wherein said header information further comprises frame-specific header information, and wherein the frame-specific header information of the one or more header frames whose received form of the common header information is different to said reference is excluded from use.

9. An apparatus according to claim 7, wherein said header information further comprises frame-specific header information, and wherein the frame-specific header information of the one or more header frames whose received form of the common header information is different to said reference is used in a different way compared to the frame-specific header information of those header frames whose received form of the common header information is the same as said reference.

10. An apparatus according to claim 9, wherein the frame-specific information used in a different way is an end-of-message indicator of a first end of message recognition method, and responsive thereto is triggered a second end-of-message recognition method.

11. An apparatus according to any of claims 7–10, wherein said header information is forward error correction encoded using a block-based coding scheme.

12. An apparatus according to any of claims 7–11, wherein data frames received before said reference is determined are buffered prior to processing after said reference is determined.

* * * * *